Patented June 14, 1927.

1,631,974

UNITED STATES PATENT OFFICE.

WHARTON B. McLAUGHLIN, OF NEW YORK, N. Y.; CELIA BROWN McLAUGHLIN ADMINISTRATRIX OF SAID WHARTON B. McLAUGHLIN, DECEASED.

METHOD OF PRESERVING FRUITS.

No Drawing. Application filed September 25, 1924. Serial No. 739,923.

This invention relates to the art of preserving fruits, and has for its object the production of jams and syrups containing the full fruit flavor.

It is especially applicable to such fruits as peaches, apricots, apples, bananas, oranges and pineapples from which no fruit preserve containing the full and natural fruit flavor has been made, attempts to preserve them by the ordinary processes such as are used for the preservation of small fruits such as berries (that is, a layer of berries, a layer of sugar, another layer of berries, another layer of sugar, and so on until the container is filled when it is placed in cold storage until a syrup and preserved berry results), have always resulted in failure; both the preserve and the syrup acquiring a disagreeable flavor caused by the action of an enzyme contained in the fruit which begins to act as soon as the integment of the fruit is broken.

It is well known that antiseptics inhibit the action of these enzymes and that approximately saturated sugar solutions, with or without the supplementary action of some other antiseptic or preservative, are usually relied upon to preserve jams, syrups, etc. It is also well known that if a piece of apple or peach be covered with powdered sugar or immersed in a saturated sugar solution and maintained at a temperature below that at which yeast organisms function the fruit will turn brown and become unpalatable during process of preservation by the sugar.

It has been and is now thought that these facts prohibit the preservation of such fruit as apples, peaches, etc., by the sugar refrigeration method.

I have discovered that these failures are due to the fact that when a piece of fruit is of ordinary size the action of the enzyme proceeds faster than the saturation of the fruit by sugar or in other words the oxidase causes discoloration and bad taste before the saturation of sugar in the piece of fruit is of sufficient degree to inhibit the 'action of the enzyme.

I have further discovered that if pieces of fruit such as apples, peaches, etc., be mixed with powdered sugar in amounts such that when all is dissolved the fruit juices will be approximately saturated with sugar and the mixture milled so as to finely comminute the fruit and at the same time thoroughly mix it with the sugar, the sugar saturation proceeds faster than enzymic action, and enzymic action is thus inhibited by the sugar saturation. The resulting mixture is kept at a temperature of about 50 to 70 Fahrenheit for approximately twenty-four hours when the sugar saturation is complete, the mixture will be self-preserving, will retain the full fruit flavor, and its color will not change at ordinary temperature. The combination and intimate mixture of the fruit with sugar and its maintenance at a proper temperature during the period of saturation is my new method and the resulting mixture my new product. This method is not only an advantage in preserving fruits such as peaches, apples, etc., to which the ordinary sugar refrigeration is not applicable, but also in the preservation of berries as it avoids the slight fermentation which inevitably occurs in the interval of time between the packing of the berries and their reaching the temperature at which fermentation is inhibited.

It is evident that for reasons of convenience in consumption a portion of syrup may be removed from the mixture when there would result a thickened self-preserving mass consisting of the fruit pulp preserve in saturated sugar solution and a self-preserving syrup. Both of these articles would contain the full fruit flavor and are well within the scope of my invention.

Having described my invention, that which I now claim as new is—

The method of preserving fruits which consists in mixing the fruit with sugar, immediately milling the mixture so as to finely comminute the fruit and mix it thoroughly with the sugar before fermentation takes place, and maintaining the mixture at a temperature sufficiently low that fermentation is prevented until it is self-preserving.

Signed at city of New York, in the county of New York and State of New York, this 24th day of September A. D. 1924.

WHARTON B. McLAUGHLIN.